(12) United States Patent
Davis et al.

(10) Patent No.: US 8,086,187 B1
(45) Date of Patent: Dec. 27, 2011

(54) DEVELOPING AND ANALYZING A COMMUNICATION SYSTEM

(75) Inventors: William H. Davis, Columbia City, IN (US); John H. VanPatten, Columbia City, IN (US); Lee A. McMillan, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 669 days.

(21) Appl. No.: 12/207,810

(22) Filed: Sep. 10, 2008

Related U.S. Application Data

(60) Provisional application No. 60/971,294, filed on Sep. 11, 2007.

(51) Int. Cl.
*H04B 17/00* (2006.01)
(52) U.S. Cl. ...... 455/67.13; 455/63.1; 455/73; 375/227; 375/285

(58) Field of Classification Search ............. 455/63.1, 455/67.13, 73, 522
See application file for complete search history.

(56) References Cited

U.S. PATENT DOCUMENTS

| | | | |
|---|---|---|---|
| 6,892,073 B2 * | 5/2005 | Fattouch | 455/446 |
| 7,406,320 B1 * | 7/2008 | Kumar et al. | 455/456.1 |
| 2003/0040277 A1 * | 2/2003 | Deats | 455/63 |

* cited by examiner

*Primary Examiner* — Tuan H Nguyen
(74) *Attorney, Agent, or Firm* — Daly, Crowley, Mofford & Durkee, LLP

(57) ABSTRACT

In one aspect, a method to simulate performance of a communication system includes providing a list of interference components to a user, receiving from the user selections of interference components from the list of the interference components, performing an analysis based on the user selections of the interference components and rendering a result of the analysis.

23 Claims, 14 Drawing Sheets

DEVELOPING AND ANALYZING A COMMUNICATION SYSTEM

RELATED APPLICATIONS

This patent application claims priority to Provisional Patent Application Ser. No. 60/971,294, filed Sep. 11, 2007 entitled "Communications System Engineering Tool (COMSET)."

BACKGROUND

In a simple communication system, two radios communicate with each other. Communication from a radio transmitter to a radio receiver can be corrupted by interference. For example, one or more additional radio transmitters may be radiating at the same time the radio receiver is receiving. This causes degradation in the receiver performance. Interference includes a number of components such as receiver gain compression, transmit and receive intermodulation products, transmitter spectral noise and so forth.

SUMMARY

In one aspect, a method to simulate performance of a communication system includes providing a list of interference components to a user, receiving from the user selections of interference components from the list of the interference components, performing an analysis based on the user selections of the interference components and rendering a result of the analysis.

In another aspect, an apparatus to simulate performance of a communication system includes circuitry to provide a list of interference components to a user, receive from the user selections of interference components from the list of the interference components, perform an analysis based on the user selections of the interference components and render a result of the analysis.

In a further aspect, an article includes a machine-readable medium that stores executable instructions to simulate performance of a communication system. The instructions causes a machine to provide a list of interference components to a user, receive from the user selections of interference components from the list of the interference components, perform an analysis based on the user selections of the interference components and render a result of the analysis.

DETAILED DESCRIPTION

Figure 1:
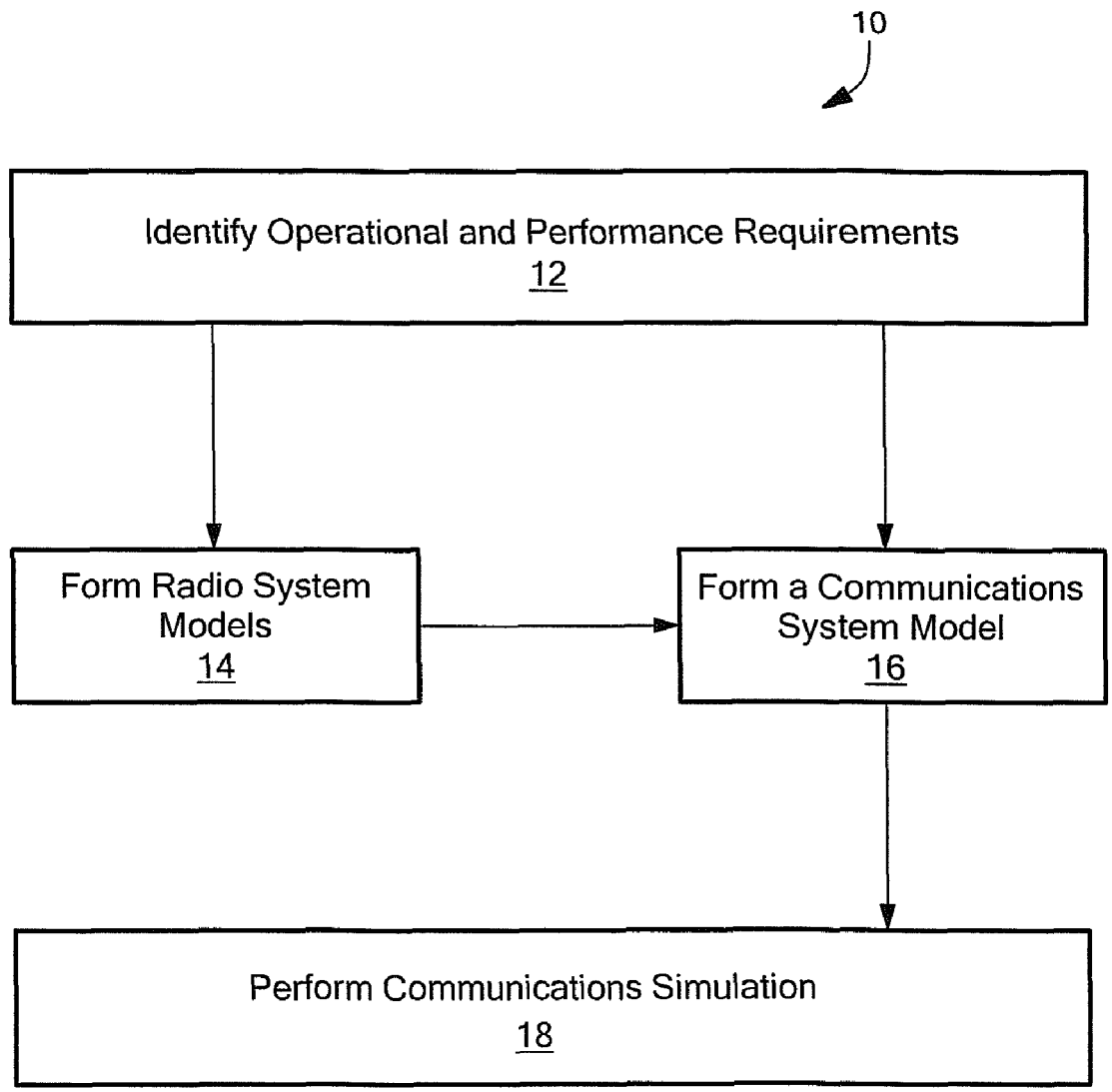
FIG. 1 is a flow chart of a process to form and use a communication system simulation tool.

Developing a multi-channel communication system is complex due to the potential interference that can result from collocated transmitters. The need for long-range/high data rate communication results in higher transmitter power and more sensitive receivers. This combined with multiple communication channels for a densely populated frequency spectrum results in a higher likelihood of interference. Optimizing the cost/performance as well as the time to design an architecture is critical in the development of these communication systems.

A communication system simulation tool described herein, to determine the performance of a receiver subject to interference, provides a more accurate interference analysis than alternative prior art methods and provides an architecture development capability that is not currently available. For example, prior art attempts at predicting interference provided an analysis method only but did not provide insight to the specific causes or mechanisms involved. Without this information, interference mitigation can only be achieved by trial and error. In another example, prior art attempts at predicting interference used a method known as Frequency Dependent Rejection (FDR), which only provides an estimate of the interference.

Unlike the prior art approaches, the communication system simulation tool described herein provides an accurate characterization of the communication system and quantifies the interference mechanisms, which provides insight into the performance parameters that can be changed in order to optimize the performance of the communication system and minimize the architecture development time.

For example, the communication system simulation tool described herein provides an architecture development capability by allowing the user control of the interference mechanisms. This provides insight into the performance parameters that can be changed in order to optimize the performance/cost of the communication system and minimize the architecture development time.

In general, receivers are susceptible to interference from collocated emitters but respond differently depending on the receiver design, receiver's operational mode, and type of interference mechanism. Estimates of interference are often made using FDR. FDR accounts for the effect that not all of the energy available to the receiver is accepted by it. FDR can be separated into two terms, Off-Frequency Rejection (OFR), and On-Tune Rejection (OTR). OFR accounts for the loss of energy due to any detuning of the interferer from the receive channel and OTR accounts for the emission spectrum of the interferer being different than the receiver bandwidth. FDR is given by the Equation 1:

$$FDR = OFR \cdot OTR = \frac{\int_0^\infty S(f) \cdot \delta f}{\int_0^\infty S(f) \cdot R(f + \Delta f) \cdot \delta f} = \frac{\int_0^\infty S(f) \cdot \delta f}{\int_0^\infty S(f) \cdot R(f) \cdot \delta f} \cdot \frac{\int_0^\infty S(f) R(f) \cdot \delta f}{\int_0^\infty S(f) \cdot R(f + \Delta f) \cdot \delta f} \quad (1)$$

where S(f) is an interferer power density (Watts), R(f) is a ratio of the on-tune CW power needed to produce a specific receiver response, to the interference power needed to produce the same response (unitless) and Δf is a difference between the interferer's frequency and receiver tuned frequency (Hz).

Similarly, the receiver degradation can be determined as a function of the interferer offset frequency from the receive channel frequency and can be characterized by the Signal-to-Interference Ratio (SIR). The SIR is the ratio of the desired signal to the total interference/noise powers as shown in Equation 2. The segregation of the individual interference components in the denominator, each consisting of multiple interferers at different frequency offsets, is combined to determine the total receiver degradation. Implementation of Equation 2 in this manner provides the ability to include/exclude each individual interference component.

$$SIR = \frac{S}{I} = \frac{S_D G(\Delta f)}{\begin{array}{c} N_r(\Delta f) + N_{PNr}(\Delta f) + P_{ci}(\Delta f) + P_{mi}(\Delta f) + \\ N_{Si}(\Delta f) + N_{PNrIM}(\Delta f) + P_{ciIM}(\Delta f) + N_{SiIM}(\Delta f) \end{array}} \quad (2)$$

where:

$S_D$ is a desired signal power (Watts),
$G(\Delta f)$ is a receiver power gain compression (unitless),
$N_r(\Delta f)$ is a receiver thermal noise power which is affected by the receiver power gain compression (Watts),
$N_{PNr}(\Delta f)$ is a receiver phase noise power due to an interference carrier (Watts),
$P_{ci}(\Delta f)$ is a interference carrier power (Watts),
$P_{mi}(\Delta f)$ is a portion of the interference modulation power that can be detected (Watts),
$N_{Si}(\Delta f)$ is a interference spectral noise power (phase noise, broadband noise, etc.) (Watts),
$N_{PNrIM}(\Delta f)$ is a receiver phase noise power due to an intermodulation product (Watts),
$P_{ciIM}(\Delta f)$ is an intermodulation product carrier power (Watts) and
$N_{SiIM}(\Delta f)$ is an intermodulation product spectral noise power (phase noise, broadband noise, etc.) (Watts).

The interference components that make-up the total interference are provided in the denominator of Equation 2 are independent of one another so that a communication system engineer designing a communication system can isolate the different interference components to observe and evaluate their effects, for example, by turning on or off selected interference components to troubleshoot and isolate performance problems. The ability to selectively include/exclude these individual interference components provides a total communication system analysis design and development capability in its operational environment. The interference components have nonlinear and frequency dependent properties in order to provide an accurate representation of a communication system. Thus, Equation 2 is used as the basis of the communication system simulation tool described herein.

Each of the interference components may be represented by separate equations. For example, the receiver gain compression can be approximated using Equation 3:

$$G(\Delta f) = \frac{1}{1 + \Lambda \left( \frac{L_{RF}(\Delta f) P_I}{IP_3} \right)^K} \quad (3)$$

where $IP_3$ is an in-band input $3^{rd}$ order intercept power (Watts), $P_I$ is an input interference carrier power (Watts), $L_{RF}(\Delta f)$ is a normalized (centered at 0 Hz) RF selectivity filter response (unitless) and K and $\Lambda$ are constants depending on the type of compression characteristic (unitless).

The receiver gain compression is a function of the total power where the $3^{rd}$ order intercept power is referenced. Therefore, for multiple interference sources the product of $L_{RF}(\Delta f)$ and $P_I$ can be replaced with the summation of all interference sources as indicated in the following transformation as shown in Equation 4:

$$L_{RF}(\Delta f) P_I \Rightarrow \sum_{n=1}^{N} L_{RF}(\Delta f_n) P_{I_n} \quad (4)$$

where N is a number of interferers (unitless), $L_{RF}(\Delta f_n)$ is an RF selectivity filter loss for the $n^{th}$ interferer (unitless) and $P_{I_n}$ is an input carrier power for the $n^{th}$ interferer (Watts).

The total thermal noise power for the receiver can be found by multiplying the IF filter response by the total thermal noise power spectral density and integrating this product over all frequencies. Since the IF filter response is normalized (center frequency set to 0 Hz) it is modified such that the response is centered at the offset frequency. However, for multiple interferers, the total receiver thermal noise is no longer a function of a single offset frequency since many offsets may be involved. The total receiver thermal noise power can be found using Equation 5:

$$N_r(\Delta f) = N_{th} \cdot 2 \cdot \int_0^{\infty} L_{IF}(\Delta f) \cdot \delta f \quad (5)$$

where $L_{IF}(\Delta f)$ is a normalized IF selectivity filter response (unitless.)

Interference signals that are not completely filtered by the RF selectivity filter are frequency converted by the receiver's mixer and Local Oscillator (LO). The LO phase noise is superimposed onto the interference signal. This process is referred to as reciprocal mixing. Depending on the frequency offset, the phase noise falls within the IF filter passband degrading the receiver performance. For a large interference signal, the interferer is also affected by the receiver gain compression. The phase noise power can be found using Equation 6, which includes the transformation for multiple interferers:

$$N_{PNr}(\Delta f) = L_{RF}(\Delta f) \cdot G(\Delta f) \cdot P_I \cdot \int_0^{\infty} N_{SSBr}(f) \cdot L_{IF}(|f - \Delta f|) \cdot \delta f \Rightarrow \quad (6)$$

$$\sum_{n=1}^{N} N_{PNr_n(\Delta f_n)}$$

where $N_{SSBr}(\Delta f)$ is a receiver single sideband phase noise density ($Hz^{-1}$) and $P_I$ is an input interference carrier power (Watts).

This reciprocal mixing effect also occurs for intermodulation products. The phase noise power can be found using Equation 7, which includes the transformation for multiple intermodulation products:

$$N_{PNrIM}(\Delta f) = \quad (7)$$

$$L_{Rf}(\Delta f) \cdot G(\Delta f) \cdot p_{IM} \cdot \int_0^{\infty} N_{SSBr}(f) \cdot L_{IF}(|f - \Delta f|) \cdot \delta f \Rightarrow$$

$$\sum_{n=1}^{N} N_{PNrIM_n}(\Delta f_n)$$

where $p_{IM}$ is an intermodulation product level (Watts).

Interference signals that are close enough in frequency offset and are not completely filtered by the IF filter add to the receiver noise and degrade the receiver's performance. This is referred to as fundamental interference. For a large interference signal, the interferer is also affected by the receiver gain compression. The interference power due to the carrier can be found using the following Equation 8, which includes the transformation for multiple interferers:

$$P_{ci}(\Delta f) = L_{IF}(\Delta f) \cdot L_{RF}(\Delta f) \cdot G(\Delta f) \cdot P_I \Rightarrow \sum_{n=1}^{N} P_{ci_n}(\Delta f_n) \qquad (8)$$

This fundamental interference effect also occurs for intermodulation products. This can be found using the following Equation 8, which includes the transformation for multiple intermodulation products:

$$P_{ciIM}(\Delta f) = L_{IF}(\Delta f) \cdot L_{RF}(\Delta f) \cdot G(\Delta f) \cdot p_{IM} \Rightarrow \sum_{n=1}^{N} P_{ciIM_n}(\Delta f_n) \qquad (9)$$

Depending on the type of interference modulation and type of detector in the receiver, $P_{mi}(\Delta f)$ from Equation 2 has a unique interference effect. This interference mechanism is specifically identified so that this effect can be included as new combinations are identified and is an area of further study.

For an AM modulated interferer and an AM detector, non-linearities in the receiver will cause the interference modulation to be superimposed onto the desired signal. This is referred to as cross-modulation. The interference modulation is detected along with the desired signal causing distortion. For a large interference signal, the desired and interference signals are also affected by the receiver gain compression. The portion of the interference modulation power that is detected can be calculated using Equation 9:

$$P_{mi}(\Delta f) 8 \cdot S_D \cdot G(\Delta f) \cdot \left( \frac{m_I L_{RF}(\Delta f) \cdot P_I}{IP_3} \right)^2 \qquad (9)$$

where $m_I$ is the modulation index for the AM modulated interferer (unitless).

When an in-band and out-of-band $IP_3$ limit is considered, Equation 9 can be modified. For example, $L_{RF}(\Delta f)$ can be replaced with $L_{RFo}(\Delta f)$ and $IP_3$ becomes the in-band value ($IP_{3i}$) which is the same as removing $L_{RF}(\Delta f)$ and replacing $IP_3$ with the response found in Equation 10:

$$IP_3(\Delta f) = \frac{IP_{3i}}{L_{RFo}(\Delta f)} \qquad (10)$$

where $IP_{3i}$ is the RF in-band input $3^{rd}$ order intercept power (Watts).

If in-band and out-of-band $3^{rd}$ order intercept limits are considered for the receiver, the normalized RF selectivity filter response is modified using equation 11:

$$L_{RFo}(\Delta f) = \left(1 - \frac{IP_{3i}}{IP_{3o}}\right) \cdot L_{RF}(\Delta f) + \frac{IP_{3i}}{IP_{3o}} \qquad (11)$$

where $IP_{3o}$ is the RF out-of-band input $3^{rd}$ order intercept power (Watts). In general, any interference that has an AM component causes cross-modulation in any receiver and is detected in an AM receiver.

The interference source contains spectral noise that falls within the RF selectivity and is converted and falls within the IF selectivity. The spectral noise power can be found using Equation 12, which includes the transformation for multiple interferers:

$$N_{Si}(\Delta f) = \qquad (12)$$

$$P_I \cdot \int_0^\infty N_{SDi}(f) \cdot L_{RF}(|f - \Delta f|) \cdot L_{IF}(|f - \Delta f|) \cdot \delta f \Rightarrow \sum_{n=1}^{N} N_{Si_n}(\Delta f_n)$$

where $N_{SDi}(\Delta f)$ is the interference signal spectral noise density ($Hz^{-1}$).

This spectral noise effect also occurs for intermodulation products except that the relative spectral noise density is increased from the fundamental depending on the order of the harmonic involved in creating the product. The intermodulation product spectral noise power can be found using Equation 13, which includes the transformation for multiple intermodulation products:

$$N_{SiIM}(\Delta f) = \qquad (13)$$

$$p_{IM} \cdot \int_0^\infty N_{SDiIM}(\Delta f) \cdot L_{RF}(|f - \Delta f|) \cdot L_{IF}(|f - \Delta f|) \cdot \delta f \Rightarrow$$

$$\sum_{n=1}^{N} N_{SiIM_n}(\Delta f_n)$$

where $N_{SDiIM}(\Delta f)$ is the intermodulation product spectral noise density ($Hz^{-1}$)

The intermodulation product levels of a device can be determined by applying a power series expansion. Considering all orders, the output signal is found by applying the Taylor series expansion in Equation 14:

$$V_o(t) = \sum_{n=0}^{\infty} b_n \cdot V_i^n(t) \qquad (14)$$

where $V_i(t)$ is the input signal (Volts) and $b_n$, is the $n^{th}$ order distortion term.

For an infinite number of signals with arbitrary amplitudes, the input signal is given in Equation 15 as:

$$V_i(t) = \sum_{m=1}^{\infty} A_m \cdot \cos(\omega_m t) \qquad (15)$$

where $A_m$ is the amplitude of the $m^{th}$ tone (Volts) and $\omega_m$ is the angular frequency of the $m^{th}$ tone (Radians/s).

The distortion terms are given in Equation 16:

$$b_n = \begin{cases} \dfrac{\left(\frac{n+1}{2}\right)! \cdot \left(\frac{n-1}{2}\right)! \cdot 2^{(n-1)}}{n! \cdot IP_n^{\left(\frac{n-1}{2}\right)}} & \text{for } n \text{ odd} \\[2ex] \dfrac{\left(\frac{n}{2}\right)! \cdot \left(\frac{n}{2}\right)! \cdot 2^{(n-1)}}{n! \cdot IP_n^{\left(\frac{n-1}{2}\right)}} & \text{for } n \text{ even} \end{cases} \qquad (16)$$

where $IP_n$ is the $n^{th}$ order intercept power (Watts).

After the series is expanded, the product levels can be determined by order and number of tones. The general solution for the product level (Watts) resulting from any number of tones and any order can be found to be as shown in Equation 17 as:

$$p_{M,n} = \chi_{M,n}^2 \cdot \frac{\prod_{m=1}^{M} P_m^{|a_m|}}{IP_n^{(n-1)}} \quad (17)$$

where $$n = \sum_{m=1}^{M} |a_m|$$

is the product order (integer), $$\chi_{M,n} = c_{M,n} \cdot b_n \cdot IP_n^{\left(\frac{n-1}{2}\right)}$$

is a constant, M is the number of tones (integer), $a_m$ is the harmonic order of the $m^{th}$ tone (±integer), $P_m$ is the level of the $m^{th}$ tone (Watts) and $c_{M,n}$ is a constant associated with each term in the expanded series for a given order and number of tones and can be found using in Equation 18 as:

$$c_{M,n} = \frac{n!}{2^{(n-1)} \prod_{m=1}^{M} |a_m|!} \quad (18)$$

Including the expanded series constant, the product level constant ($\chi_{M,n}$) reduces to Equation 19 as:

$$\chi_{M,n} = \begin{cases} \dfrac{\left(\frac{n+1}{2}\right)! \cdot \left(\frac{n-1}{2}\right)!}{\prod_{m=1}^{M} |a_m|!} & \text{for } n \text{ odd} \\[2ex] \dfrac{\left(\frac{n}{2}\right)! \cdot \left(\frac{n}{2}\right)!}{\prod_{m=1}^{M} |a_m|!} & \text{for } n \text{ even} \end{cases} \quad (19)$$

Combining Equation 17 and Equation 19 results in Equation 20 for the intermodulation product level for any number of tones (M) and any order (n):

$$P_{M,n} = \begin{cases} \dfrac{\left[\left(\frac{n+1}{2}\right)! \cdot \left(\frac{n-1}{2}\right)!\right]^2}{IP_n^{(n-1)}} \cdot \prod_{m=1}^{M} \dfrac{P_m^{|a_m|}}{(|a_m|!)^2} & \text{for } n \text{ odd} \\[2ex] \dfrac{\left[\left(\frac{n}{2}\right)! \cdot \left(\frac{n}{2}\right)!\right]^2}{IP_n^{(n-1)}} \cdot \prod_{m=1}^{M} \dfrac{P_m^{|a_m|}}{(|a_m|!)^2} & \text{for } n \text{ even} \end{cases} \quad (20)$$

Referring to FIG. 1, an example of a process to form and use a communication system simulation tool is a process 10. A user, such as a communication system engineer, for example, determines operational and performance requirements (12). For example, communication links are identified, including the signal format (waveform) and propagation medium. The communication system (or platform) and remote terminal communication equipment are identified and their performance are determined. The location of the platform antennas and/or their coupling (or isolation) is also determined. An understanding how the communication links will be used in an operational scenario is also determined along with the Quality of Service (QoS) needed for each signal format.

The user forms radio system models (14). Some or all of the operation and requirements determined in processing block 12 is used to create various radio system models. The model characteristics account for the interference effects, including transmitter spectral power, reciprocal mixing, cross-modulation, Intermodulation Distortion (IMD), gain compression and so forth. The radio system models are non-linear and frequency dependent allowing radio systems to include the effects of amplifiers as well as the response of filters, couplers, cables and so forth.

The radio system models also include data sets. Each data set is two or three dimensional, providing accurate radio system models. For example, the receiver phase noise in the radio model is a function of offset frequency as well as the channel frequency. A receiver radio, receiver RF Distribution (RFD), transmitter (an interferer), antenna (including coupling), propagation loss, and remote radio models are created from performance data sets.

For example, the performance data sets include receiver and transmitter data. The transmitter data (associated with an interferer) includes data on reverse $IP_3$, phase noise, thermal noise and modulation spectrum. The receiver data includes noise figure, RF selectivity, input $IP_3$, phase noise and IF selectivity; and RFD data including noise figure, gain, selectivity and input IP3. Additional data includes antenna gain and coupling; remote radio data includes transmitter power, receiver noise figure and antenna gain; and propagation loss data for various antenna heights and ranges.

A communication system model is formed in the communication system simulation tool based on the operational and performance requirements determined in processing block 12 and from the radios system models determined in processing block 14. For example, parameters that define an operational scenario, along with outputs from the radio system models are used as inputs to the communication system simulation tool. These inputs define the behavior of the equipment and message traffic flow over time.

The data sets from the radio system models are used in the communication system simulation tool to generate the various interference effects such as receiver gain compression, receiver reciprocal mixing, transmitter spectral power (including thermal/AM and constant envelope/PM), IM products generated in a transmitter and generated in a receiver and detected modulation such as cross-modulation.

In one example, antenna coupling data is loaded into the communication system simulation tool from a spreadsheet. The coupling data is generated from programs such as NEC, ANTFARM, XGTD®, or a custom model. The receiver RFD data and transmit data for each unique channel are also loaded.

In one example the receiver RFD and transmitter data is generated in Advanced Design System (ADS) by Agilent Technologies, Inc. In another example, the receiver radio model is created in MATLAB® and is integrated into the communication system simulation tool.

The communication system simulation tool is also constructed by defining a number of radio channels. Each radio channel is constructed by assigning a radio (e.g., transmitter and receiver type), an RF Distribution (RFD), an antenna (e.g., antenna type), a received (desired) signal level, a frequency assignment or hop-set, a transmit/receive duty factor, a transmit/receive Intermodulation Distortion (IMD) order behavior, message length and environmental noise.

The communication system simulation tool can perform a number of analyses including link analysis without interference and link analysis with interference. The link analysis with interference includes statistical (time-domain) analysis, static (snapshot in time) analysis and swept transmitter-receiver (pair) analysis.

The statistical analysis operates on arbitrary time units. For each time unit, a frequency assignment is made and each transmitter is turned on or off based on an assigned duty factor. Interference to each receiver is then determined from the coupled power from each transmitter that has been turned on. This is repeated for each time unit until a statistically significant sample size has been reached. As a result, the probability as a function of the measure of Quality of Service (QoS) for each receiver can be determined based on the operational scenario. The measure of QoS can be represented by the input Signal-to-Noise Ratio (SNR), Signal plus Noise And Distortion to noise and distortion ratio (SINAD), or Bit Error Rate (BER). The results of the time domain analysis also determine the availability as a function of the measure of the QoS and the probability as a function of the receiver degradation.

The static analysis uses one time unit (snapshot in time) of the statistical analysis to provide results. In this case, frequency assignments can be manually changed and channels can be manually set to transmit or receive. Analysis results (input signal-to-noise ratio) can be quickly generated for this static condition. Each interference mechanism can be turned "on" or "off" prior to generating results and/or the contribution of interference can be displayed for each type of interference mechanism. For each static condition, the intermodulation product level is generated for each receiver. These product levels are displayed at the receiver input (transmitter generated) and at the receiver output (transmitter and receiver generated) with and without the IF filter selectivity.

The frequency swept transmitter-to-receiver analysis allows each transmitter/receiver pair to display the receiver degradation as a function of the transmitter offset frequency from the receiver channel frequency. Each interference mechanism can be turned on or off prior to generating results.

The communication system simulation tool processes all interference terms except IM products in blocks of 10,000 time units treating each channel as a receiver. IM products are calculated for each receive time unit in each channel. For the case of an 11 channel analysis that includes all IM products up to 5th order, there are 433,956 possible products that may exist at each of the 500,000 total time units for all eleven channels or, 433,956×500,000×11=2,386,758,000,000 products that would require evaluation, which is cumbersome if not impossible to process.

Figure 3:
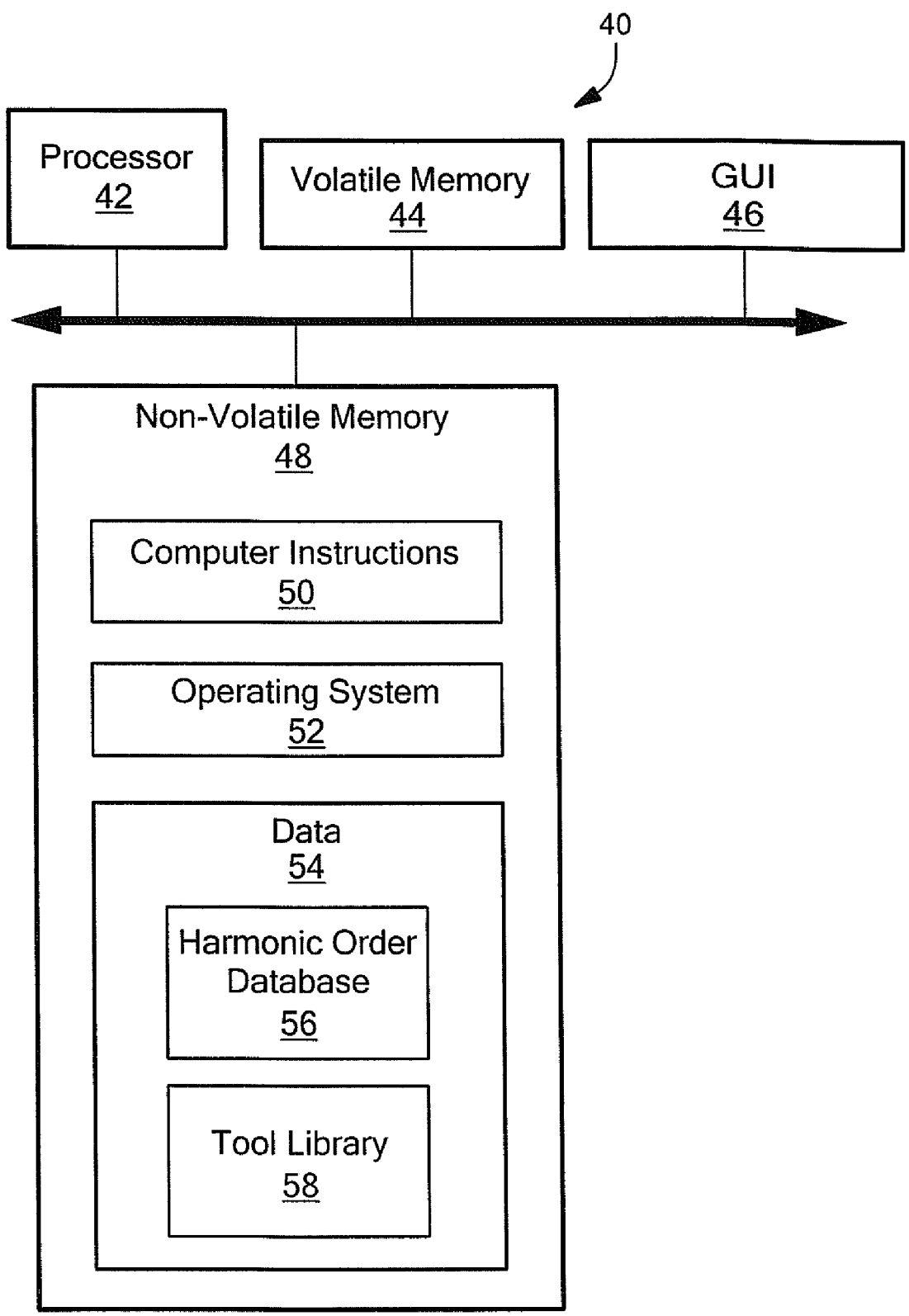
FIG. 3 is a block diagram of an example of a communication system simulation tool as a computer on which the process of FIG. 2 may be implemented.

IM product frequencies are found by multiplying each interfering signal frequency by a Harmonic Order then summing all of these products. To speed execution time, the possible harmonic orders are saved in a data file that is recalled during analysis. For example, the harmonic orders are saved in a database 59 (FIG. 3). The interfering frequencies may be thought of as a 1×J array. This array is replicated to contain the same number of rows as there are in the harmonic order table. The harmonic order array and the frequency array are multiplied element-wise and each row summed. A resulting K×1 vector includes all possible product frequencies. Any product frequency that is outside the maximum product offset frequency (specified by the user) is removed leaving only products closer to the receiver frequency than the maximum product offset frequency.

Thus, applicable information required to employ Equation 20 may be gathered and formatted such that a single "For-Next" loop is able to calculate a product level for all valid products. This IM calculation occurs in each active transmitter to obtain the reverse IM product level from each active power amplifier. These are then referred to the receiver input, through the antenna coupling, and summed resulting in a single IM product, due to transmitters, for each valid IM product. The interfering signal levels as well as the transmitter IM product level are also processed through the receiver nonlinearity to calculate the IM product level that will exist at the receiver output. The process is repeated for each valid product at each receive time unit in each channel.

Figure 2:
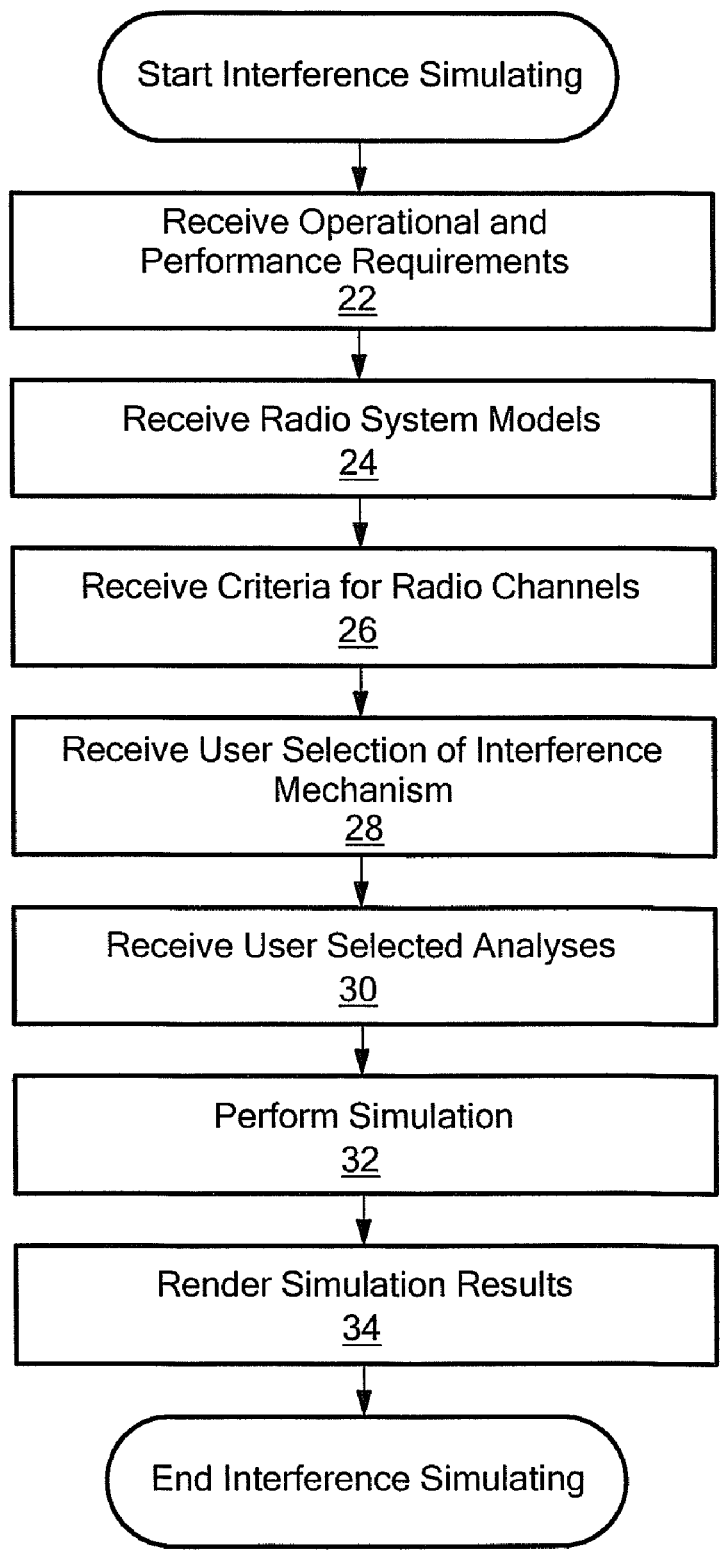
FIG. 2 is a flowchart of a process to simulate interference.

Referring to FIG. 2, an example of a process to simulate interference at a receiver is a process 20. The operational and performance requirements are received in the communication system simulation tool (22). For example, the user inputs the operational and performance requirement either manually through a graphical user interface (GUI) (e.g., a GUI 46 in FIG. 3), or imports them or a combination thereof. The communication system simulation tool receives the radio system models (24), for example, stored in the tool library 58 (FIG. 3), for example. The communication system simulation tool receives criteria for the radio channels (26). For example, a user uses the GUI to provide criteria on the channels. The communication system simulation tool receives selections of the interference mechanisms to analyze (28). For example, a user uses the GUI to make selections of the interference components to include in the simulation analysis. The communication system simulation tool receives user selections of the analyses to perform (30). For example, a user uses the GUI to make selections of the analyses to perform. The communication system simulation tool performs a simulation based on the user selections (32) and renders the results (34), for example, by displaying the results using the GUI.

Referring to FIG. 3, in one example, a communication system simulation tool may be a computer 50, which includes a processor 42, a volatile memory 44, a graphical user interface (GUI) 46 such as a mouse, a keyboard and a display, for example, and a non-volatile memory 48 (e.g., hard disk). The non-volatile memory 48 stores computer instructions 50, an operating system 52 and data 54 including a harmonic order database 56 for determining intermodulation products and a tool library 58. In one example, the computer instructions 50 are executed by the processor 42 out of volatile memory 44 to perform all or part of the process 20.

Figure 4A:
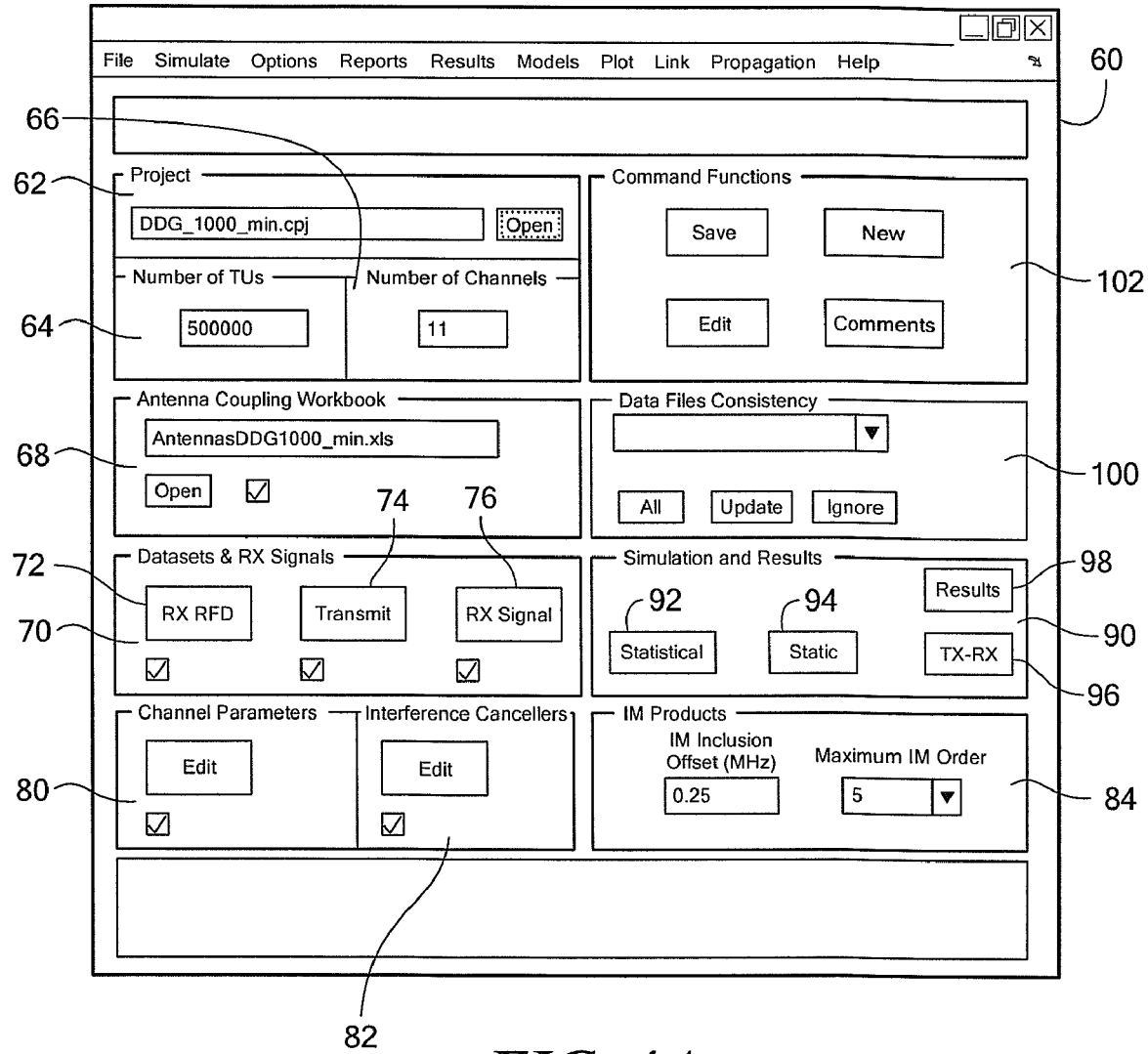
FIGS. 4A to 4K are examples of graphical user interface (GUI) screens used in the communication system simulator tool.

FIG. 4A is an example of a master GUI screen 60 used in the communications system simulation tool. The GUI screen 60 includes a project section 62, a number of time units (TUs) section, a number of channels section 66, an antenna coupling workbook section 68, a data files consistency section 100 and receiver signal section 70, a channel parameters section 80, an interference cancellers section 82, an IM products section 84, a simulation and results section 90, a data files section 100 and a command functions section 102.

The project section 62 is used to designate and reopen simulation projects. The number of TUs section 64 allows a user to enter the number of time units, for example, by using a keyboard (not shown). For example, time units are considered as samples. The number of channels section 66 allows a user to enter the number of channels for the receiver, for example, by using the keyboard. The antenna coupling workbook section 68 allows a user to designate an external file containing antenna coupling data to be imported by the communication system simulation tool.

The datasets and receiver signals section 70 is used by the user to designate datasets and receiver signals and includes a receiver RFD button 72, a transmit button 74 and a receive signal button 76. The receiver RFD button 72 activates a GUI screen (e.g., a GUI screen 200 (FIG. 4B)) that allows a user to add and modify RF distribution data. In one example, the RFD distribution data is imported. The transmit button 74 activates a GUI screen (e.g., a GUI screen 300 (FIG. 4C)) that allows a user to add and modify transmit data. In one example, the transmit data is imported. The receive signal button 76 activates a GUI screen (e.g., a GUI screen 400 (FIG. 4D)) that allows a user to add and modify receive signal data. In one example, the receive signal data is imported. Receive signal parameters may be configured using a GUI screen 500 (FIG. 4E)

The channel parameters section 80 is used to edit channel parameters. For example, a GUI screen (e.g., a GUI screen 600 (FIG. 4F) is activated to allow a user to add or edit channel parameters.

The interference cancellers section 82 is used to edit interference cancellers. For example, a screenshot (not shown) is activated to allow a user to add or edit which transmitters' interference is cancelled. The IM products section 84 allows a user to enter, for example, by the keyboard, an IM inclusion offset and maximum IM harmonic order.

The simulation and results section 90 is used by a user to designate which analyses to perform and includes a receiver a statistical button 92, a static button 94, a transmitter-receiver button 96 and results button 98. The statistical button 92 activates a GUI screen (e.g., a GUI screen 700a (FIG. 4G) or a GUI screen 700b (FIG. 4H)) that allows a user to evaluate the statistical results. The static button 74 activates a GUI screen (e.g., a GUI screen 800 (FIG. 4I) and/or a GUI screen 900 (FIG. 4J)) that allows a user to evaluate the static results. The transmitter-receiver button 96 activates a GUI screen (e.g., a GUI screen 1000 (FIG. 4K)) that allows a user to evaluate and modify the transmitter to receiver analysis. The results button 98 performs the selected analysis.

The data files consistency section 100 prompts a user when data files are inconsistent. For example, each data set being imported is time stamped. If a project for a simulation has files whose original time stamps have changed, the user is alerted (for example, the name of out of date data set is shown to the user). The user may ignore the inconsistency or update the simulation. The command functions section 102 allows a user to save a simulation, generate a new simulation, provide comment about the simulation and exit the communication system simulation tool.

Figure 4B:
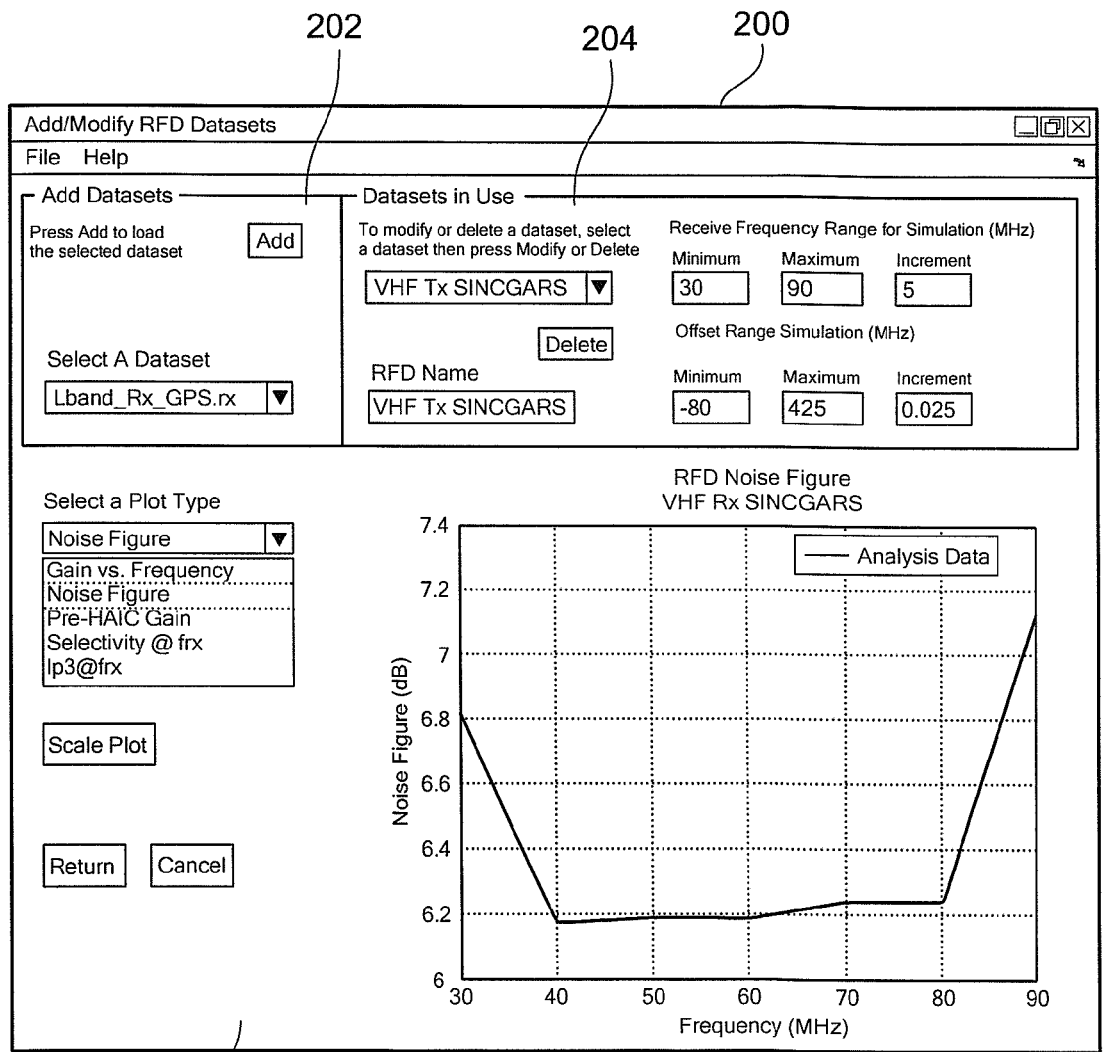

FIG. 4B is an example of the GUI screen 200 for an RF distribution dataset. The GUI screen 200 includes an add dataset section 202 to add dataset, a datasets in use section 204 to indicate which datasets are in use; and a receive frequency range for simulation and offset frequency range for simulation. The GUI screen 200 also includes a plot section 206 to select and render graphs.

Figure 4C:
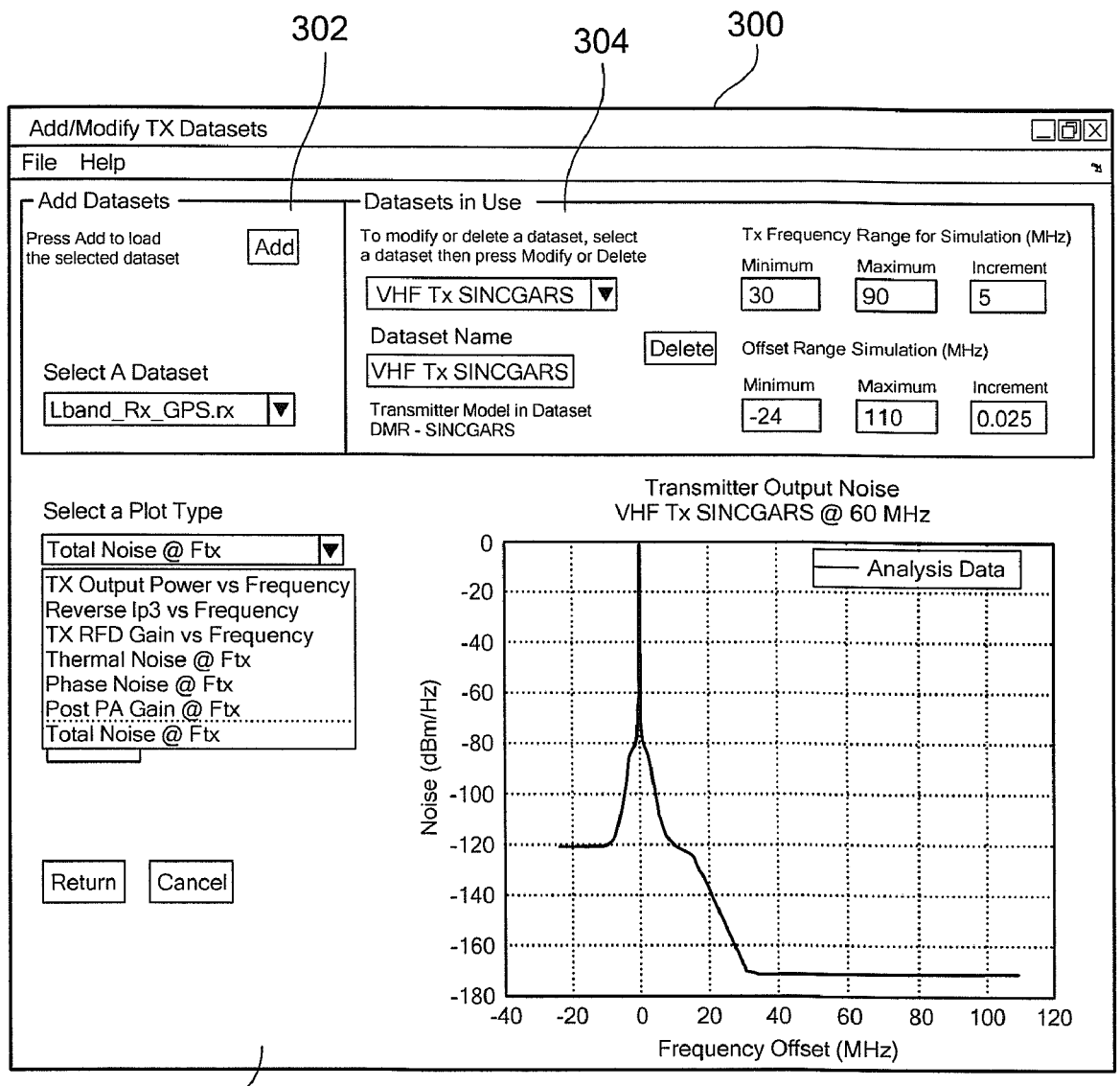

FIG. 4C is an example of the GUI screen 300 for a transmit dataset. The GUI screen 300 includes an add dataset section 302 to add dataset, a datasets in use section 304 to indicate which datasets are in use; and a receive frequency range for simulation and offset frequency range for simulation. The GUI screen 200 also includes a plot section 306 to select and render graphs.

Figure 4D:
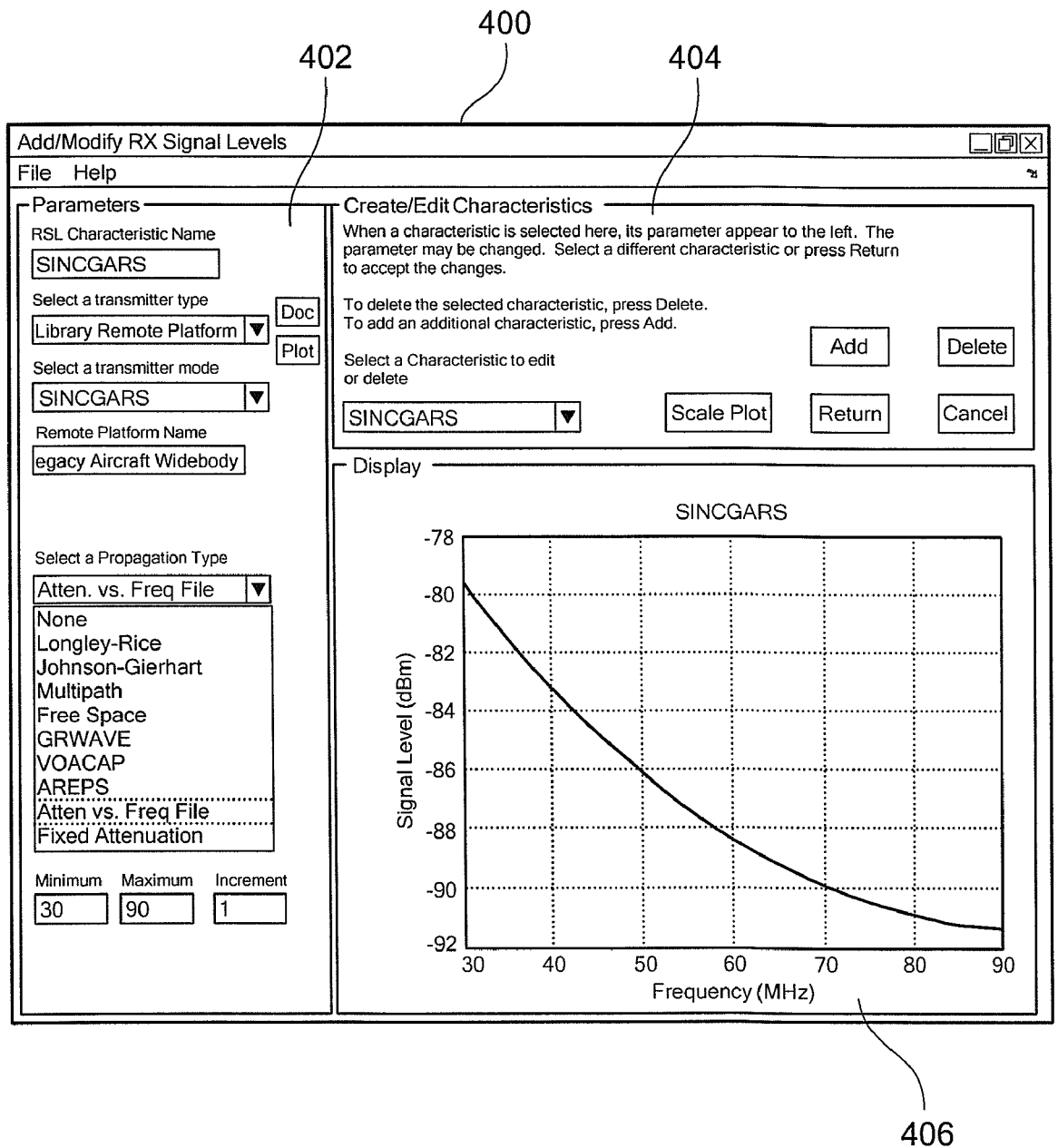
Figure 4E:
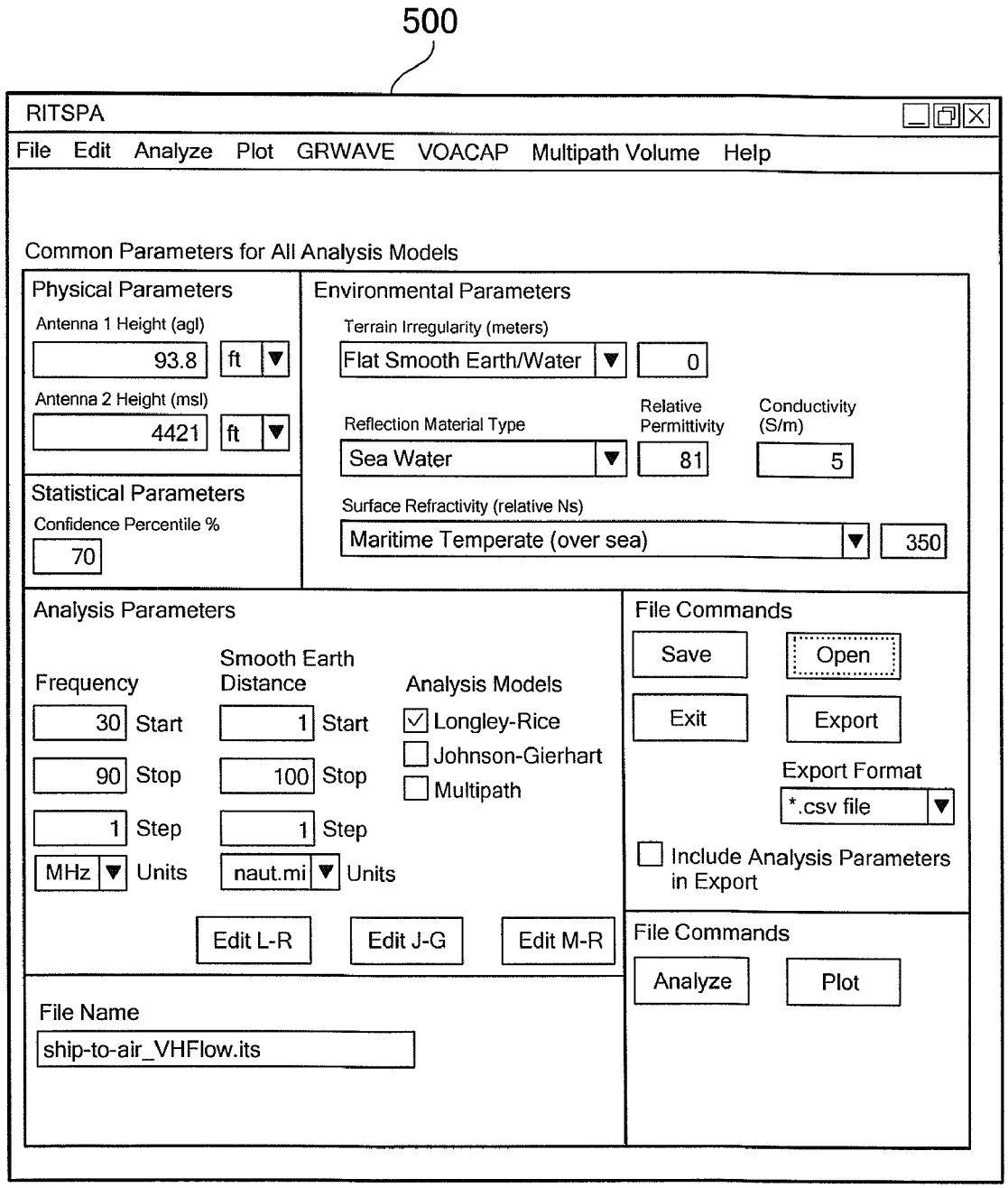

FIG. 4D is an example of the GUI screen 400 for receive signal analysis and allows the remote platform model and operating mode (waveform) to be selected in addition to the propagation data. Applications for generating the propagation data are also available. The GUI screen 400 includes a parameters section 402 to add parameters such as propagation type (e.g., Longley-Rice, Johnson-Gierhart, Multipath model, GRWAVE (ground wave), VOACAP (sky wave), Multipath, AREPS and so forth) and a transmitter mode (e.g., SINCGARS), a characteristics edit section 204 to modify the parameters in section 402, and a display section 406 to render a graph of the signal received.

FIG. 4E is an example of a GUI screen 500 to input common parameters such as physical parameters such as antenna height, environmental parameters such as terrain irregularity, statistical parameters analysis parameters including choosing an analysis model (such as Longley-Rice, Johnson-Gierhart, and Multipath) and so forth. The GUI screen 500 is used with the receive signal analysis to define the path loss.

Figure 4F:
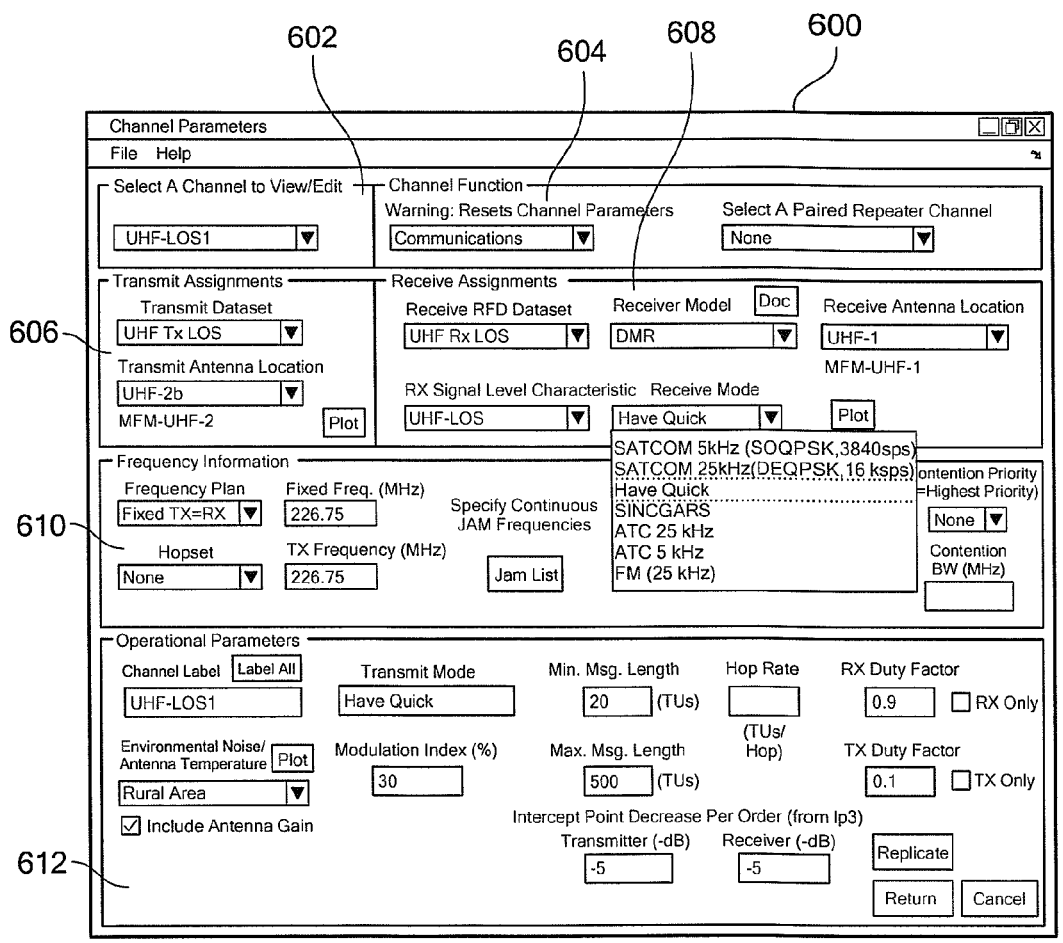

FIG. 4F is an example of the GUI screen 600 used to import the parameters of the channels. The GUI screen 600 includes a channel select section 602 to select a channel to configure; a channel function 604 to designate the function of the channel selected; a transmit assignment section 606 to designate a transmit dataset to use and a transmit data location; a receive assignments section 608 to designate a receive RFD data set to use, a receiver model, receive antenna location, receive mode and receive signal level characteristics; and a frequency information section 610 to designate a frequency plan, fixed frequency and so forth.

The GUI screen 600 also includes an operational parameters section used to designate a transmit modem minimum and maximum message length, receive duty factor, transmit duty factor, modulation index and so forth.

Figure 4G:
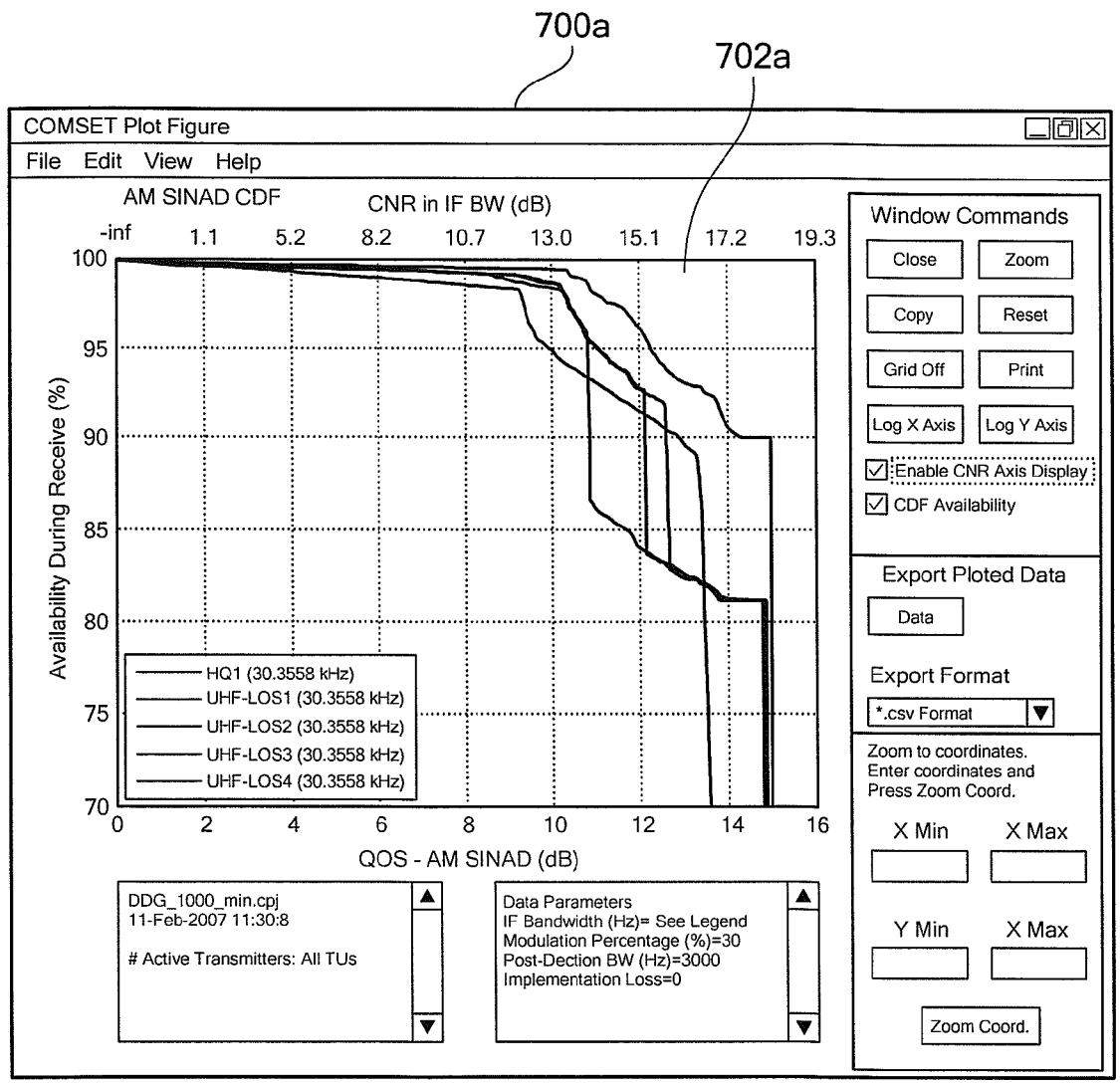
Figure 4H:
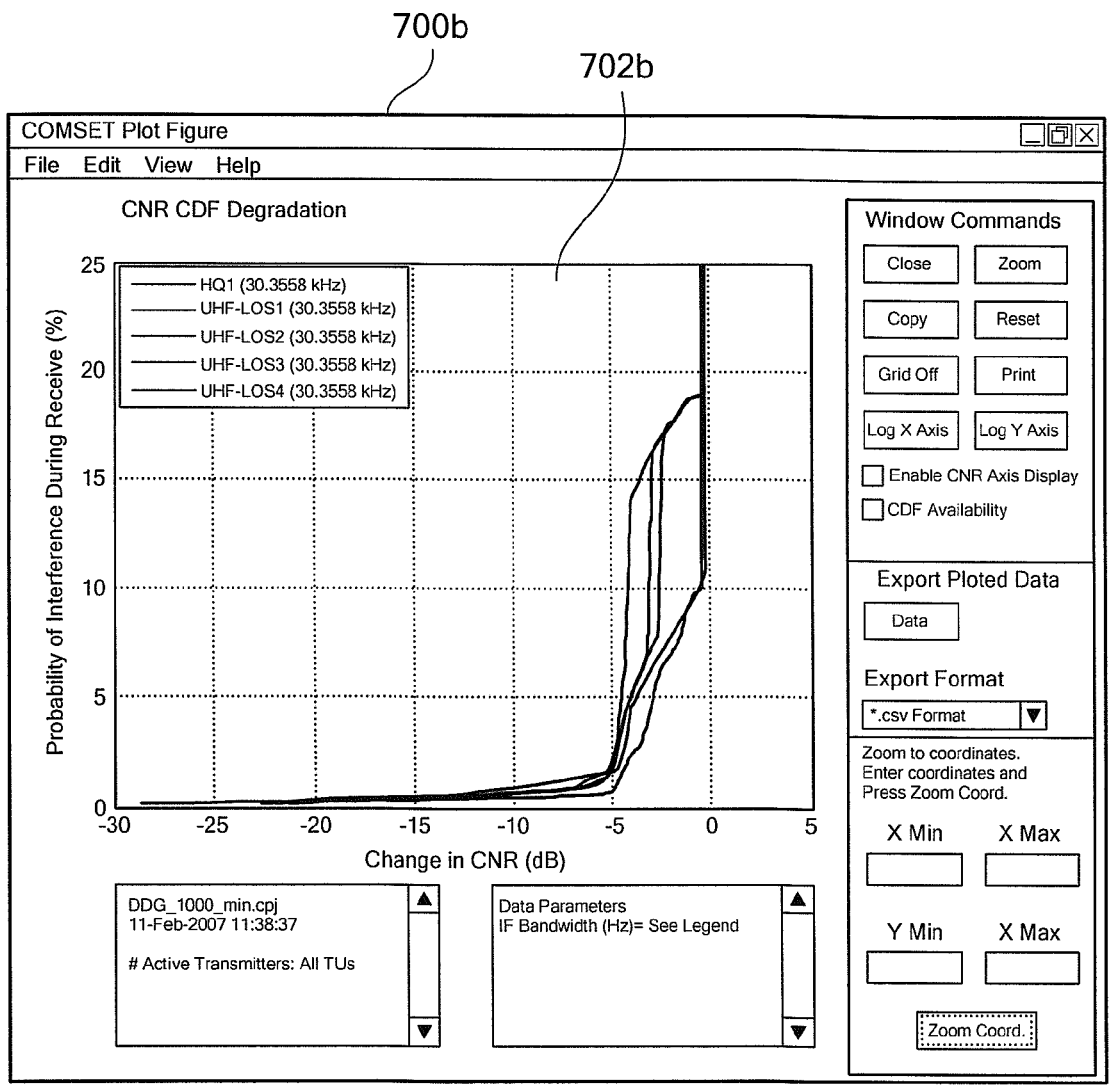

FIGS. 4G and 4H are examples of the GUI screen 700a, 700b of a statistical analysis results. The GUI screen 700a is used to evaluate availability during time to receive in an interference environment to determine the quality of links. The GUI screen 700a includes a plot section 702a to graph channels, for example, availability during receive versus QOS-AM SINAD. The GUI screen 700b is used to evaluate receiver degradation. The GUI screen 700b includes a plot section 702b to graph channels, for example, probability of interference during receive versus change in CNR.

Figure 4I:
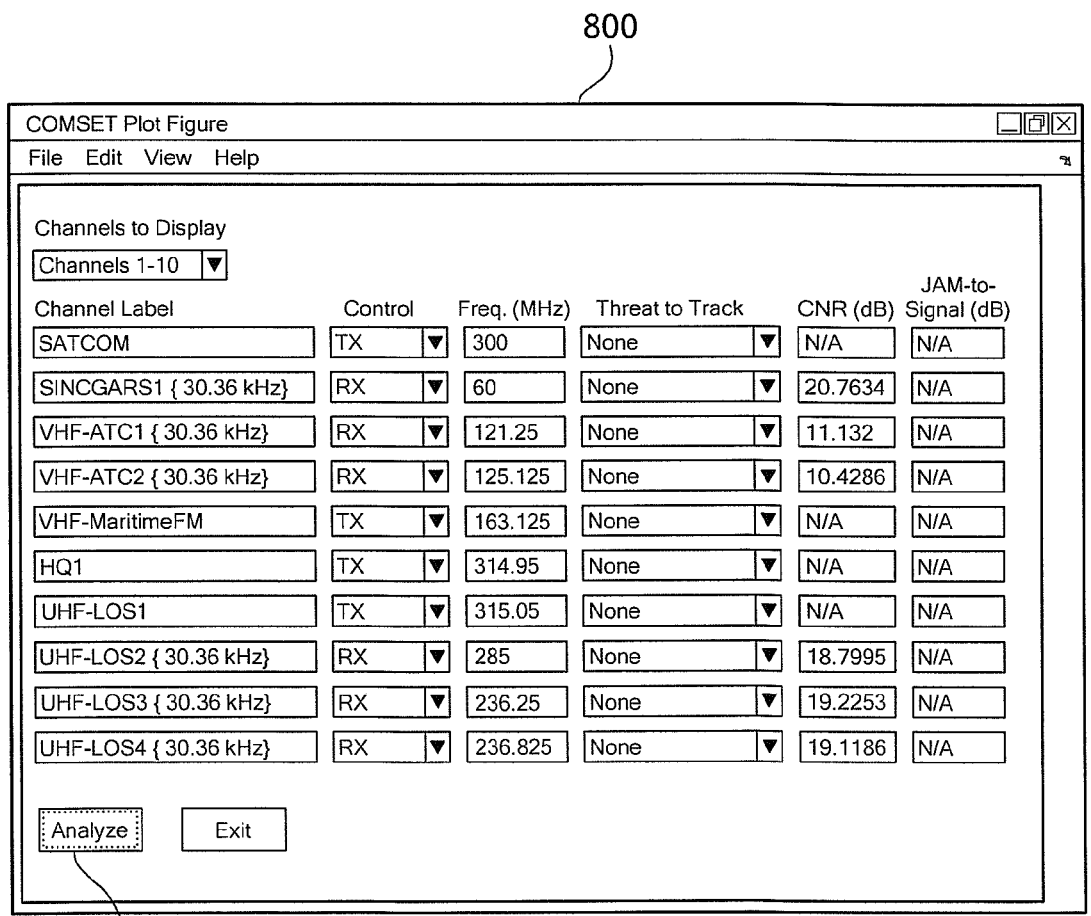
Figure 4J:
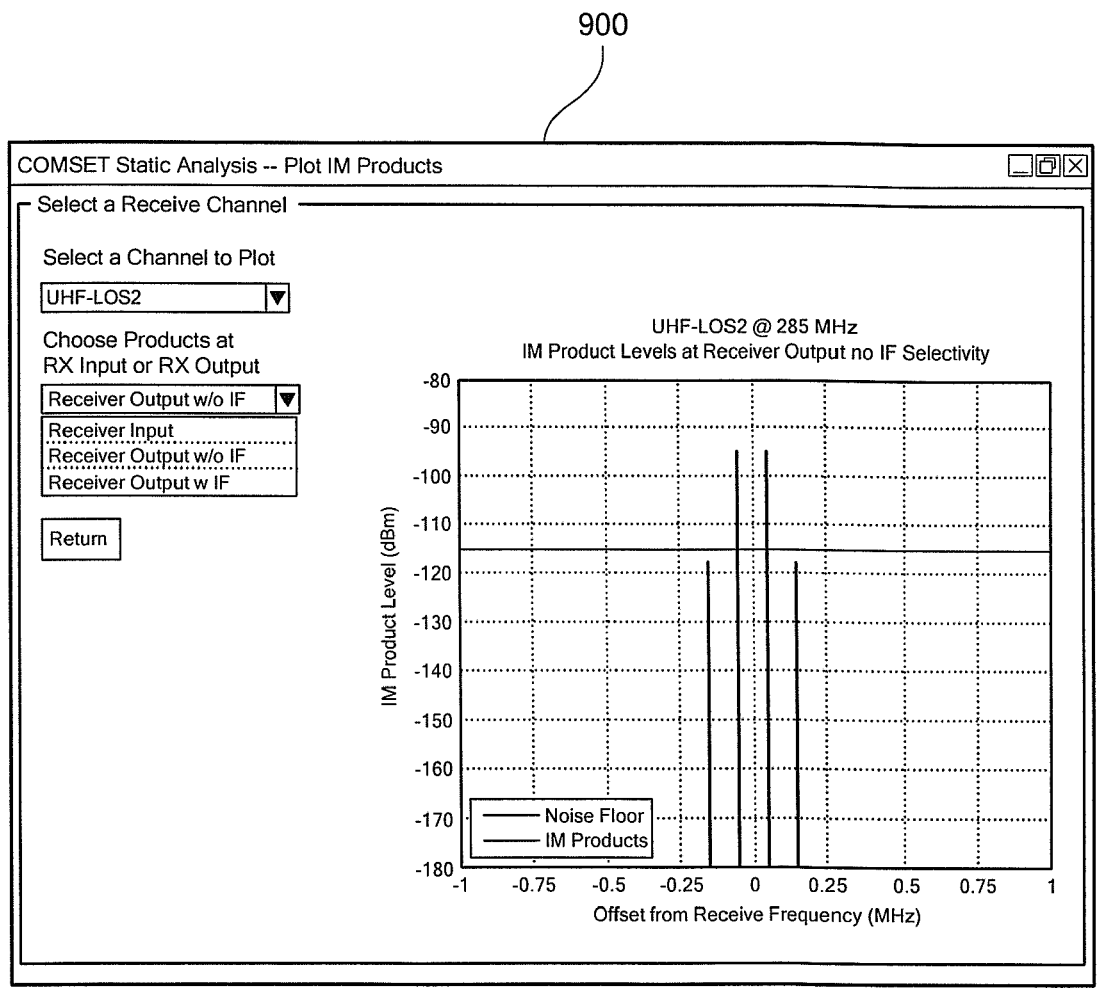

FIGS. 4I and 4J are examples of the GUI screen 800, 900 used in static analysis results. GUI screen 800 is used to evaluate the signal to noise ratio in a specific state, for example, looking at one time unit in a statistical analysis. For example, channels may be hopping around at different frequencies to broadcast and receive. GUI screen 800 allows the user determines the states of each channel by determining whether a channel is broadcasting or receiving, the frequency, the carrier-to-noise (CNR) and so forth. By depressing an analyze 802 a user is given the signal-to-noise ratio for each receiver.

The GUI screen 900 displays a graph of the intermodulation products. For example, using Equation 20, the IM products determined in the communication system simulation tool are determined much faster than in prior art methods. Thus, by modifying the parameters the user can quickly determine an optimum design solution.

Figure 4K:
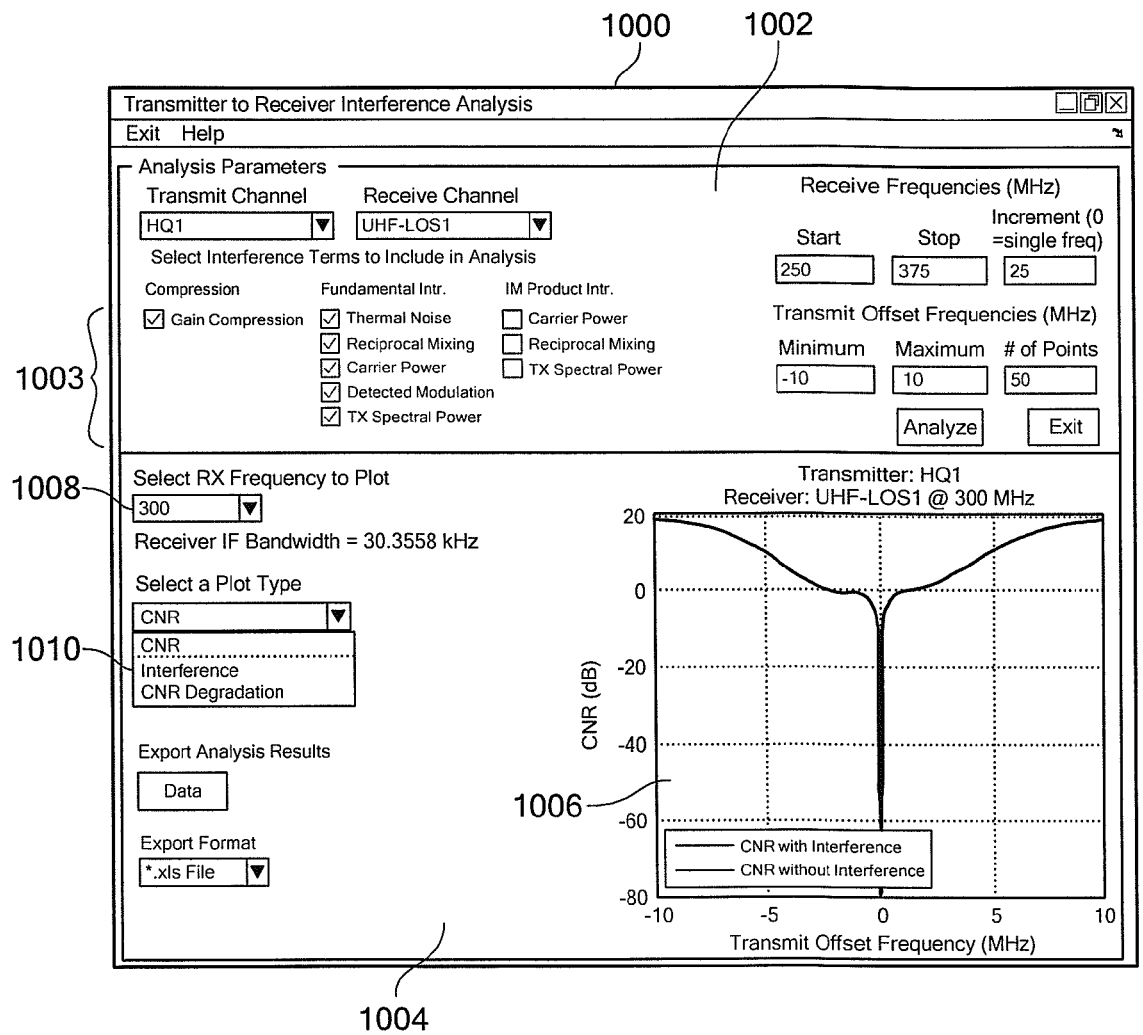

FIG. 4K is an example of the GUI screen 1000 of the frequency swept transmitter-receiver analysis. Using the communication system simulation tool, a transmitter for any transmitter/receiver pair may be frequency swept in order to determine receiver degradation as a function of the transmitter offset frequency. The GUI 1000 includes an analysis parameters section 1002 and a plot section 1004. In the analysis parameters section, the user may select or deselect interference mechanisms 1003 such as gain compression, fundamental interference components (e.g., thermal noise, reciprocal mixing, carrier power, detected modulation, transmit spectral power) and intermodulation product interference (such a carrier power, reciprocal mixing and transmit spectral power) by checking of the desired interference component. The user may also designate receive frequencies and transmit offset frequencies.

The plot section 1004 includes a graph 1006 to plot results, a select receiver frequency 1008 to select a frequency to plot the graph 1006 and a plot type section 1010 to select a type of plot (such as CNR, interference and CNR degradation) to plot on the graph 1006.

The processes described herein are not limited to the specific embodiments described. For example, process 20 is not limited to the specific processing order of FIG. 2. Rather, any of the processing blocks of FIG. 2 may be re-ordered, combined or removed, performed in parallel or in serial, as necessary, to achieve the results set forth above.

The processing blocks in FIG. 2 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Process 20 is not limited to use with the hardware and software of FIG. 3; it may find applicability in any computing or processing environment and with any type of machine or set of machines that is capable of running a computer program. Process 20 may be implemented in hardware, software, or a combination of the two. Process 20 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 20 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 20. Process 20 may also be implemented as a machine-readable storage medium, configured with a computer program, where upon execution, instructions in the computer program cause the computer to operate in accordance with process 20.

Elements of different embodiments described herein may be combined to form other embodiments not specifically set forth above. Other embodiments not specifically described herein are also within the scope of the following claims.

What is claimed is:

1. A method to simulate performance of a communication system comprising:
   providing a list of interference components to a user;
   receiving from the user selections of interference components from the list of the interference components;
   performing an analysis based on the user selections of the interference components; and
   rendering a result of the analysis,
   wherein providing a list of interference components to a user comprises providing a list of interference components comprising:
   a receiver thermal noise power;
   a receiver phase noise power due to an interference carrier;
   an interference carrier power;
   a portion of an interference modulation power that can be detected;
   an interference spectral noise power;
   a receiver phase noise power due to an intermodulation product;
   an intermodulation product carrier power;
   an intermodulation product spectral noise power; and
   a receiver power gain compression.

2. The method of claim 1 wherein providing a list of interference components to a user comprises providing a list of independent interference components.

3. The method of claim 1 wherein providing a list of interference components to a user further comprises providing a list of independent interference components satisfying a signal-to-interference ratio equal to:

$$\frac{S_D G(\Delta f)}{N_r(\Delta f) + N_{PNr}(\Delta f) + P_{ci}(\Delta f) + P_{mi}(\Delta f) + N_{Si}(\Delta f) + N_{PNrIM}(\Delta f) + P_{ciIM}(\Delta f) + N_{SiIM}(\Delta f)}$$

where:
   $S_D$ is a desired signal power,
   $G(\Delta f)$ is the receiver power gain compression,
   $N_r(\Delta f)$ is the receiver thermal noise power,
   $N_{PNr}(\Delta f)$ is the receiver phase noise power due to an interference carrier,
   $P_{ci}(\Delta f)$ is the interference carrier power,
   $P_{mi}(\Delta f)$ is the portion of the interference modulation power that can be detected,
   $N_{Si}(\Delta f)$ is the interference spectral noise power,
   $N_{PNrIM}(\Delta f)$ is the receiver phase noise power due to the intermodulation product,
   $P_{ciIM}(\Delta f)$ is the intermodulation product carrier power, and
   $N_{SiIM}(\Delta f)$ is the intermodulation product spectral noise power.

4. The method of claim 1, further comprising:
   providing to the user a list of analyses to perform, the list of analysis comprising a statistical analysis, a static and frequency swept receiver to transmitter analysis; and
   receiving from the user one or more analyses selected by the user,
   wherein performing the analysis comprises performing the analysis selected by the user from the list of analyses to perform.

5. The method of claim 1, further comprising receiving model data from a tool library.

6. The method of claim 5, further comprising:
receiving performance data on radio and antenna models;
generating the radio and antenna models based on the performance data.

7. The method of claim 1 wherein providing a list of interference components to a user comprises providing a list of interference components comprising an intermodulation component, and further comprising determining the intermodulation component by using stored harmonic orders.

8. An apparatus to simulate performance of a communication system, comprising:
circuitry to:
provide a list of interference components to a user;
receive from the user selections of interference components from the list of the interference components;
perform an analysis based on the user selections of the interference components; and
render a result of the analysis,
wherein the circuitry to provide a list of interference components to a user comprises circuitry to provide a list of interference components comprising:
a receiver thermal noise power;
a receiver phase noise power due to an interference carrier;
an interference carrier power;
a portion of an interference modulation power that can be detected;
an interference spectral noise power;
a receiver phase noise power due to an intermodulation product;
an intermodulation product carrier power;
an intermodulation product spectral noise power; and
a receiver power gain compression.

9. The apparatus of claim 8 wherein the circuitry to provide a list of interference components to a user comprises circuitry to provide a list of independent interference components.

10. The apparatus of claim 8 wherein the circuitry to provide a list of interference components to a user further comprises circuitry to provide a list of independent interference components satisfying a signal-to-interference ratio equal to:

$$\frac{S_D G(\Delta f)}{N_r(\Delta f) + N_{PNr}(\Delta f) + P_{ci}(\Delta f) + P_{mi}(\Delta f) + N_{Si}(\Delta f) + N_{PNrIM}(\Delta f) + P_{ciIM}(\Delta f) + N_{SiIM}(\Delta f)}$$

where:
$S_D$ is a desired signal power,
$G(\Delta f)$ is the receiver power gain compression,
$N_r(\Delta f)$ is the receiver thermal noise power,
$N_{PNr}(\Delta f)$ is the receiver phase noise power due to the interference carrier,
$P_{ci}(\Delta f)$ is the interference carrier power,
$P_{mi}(\Delta f)$ is the portion of the interference modulation power that can be detected,
$N_{Si}(\Delta f)$ is the interference spectral noise power,
$N_{PNrIM}(\Delta f)$ is the receiver phase noise power due to the intermodulation product,
$P_{ciIM}(\Delta f)$ is the intermodulation product carrier power, and
$N_{SiIM}(\Delta f)$ is the intermodulation product spectral noise power.

11. The apparatus of claim 8, further comprising circuitry to:
provide to the user a list of analyses to perform, the list of analysis comprising a statistical analysis, a static and frequency swept receiver to transmitter analysis; and
receive from the user one or more analyses selected by the user,
wherein circuitry to perform the analysis comprises circuitry to perform the analysis selected by the user from the list of analyses to perform.

12. The apparatus of claim 8, further comprising circuitry to receive model data from a tool library.

13. The apparatus of claim 12, further comprising circuitry to:
receive performance data on radio and antenna models;
generate the radio and antenna models based on the performance data.

14. The apparatus of claim 8 wherein the circuitry to provide a list of interference components to a user comprises circuitry to provide a list of interference components comprising an intermodulation component, and further comprising circuitry to determine the intermodulation component by using stored harmonic orders.

15. An article comprising:
a non-transitory machine-readable medium that stores executable instructions to simulate performance of a communication system, the instructions causing a machine to:
provide a list of interference components to a user;
receive from the user selections of interference components from the list of the interference components;
perform an analysis based on the user selections of the interference components; and
render a result of the analysis,
wherein the instructions causing a machine to provide a list of interference components to a user comprises instructions causing a machine to provide a list of interference components comprising:
a receiver thermal noise power;
a receiver phase noise power due to an interference carrier;
an interference carrier power;
a portion of an interference modulation power that can be detected;
an interference spectral noise power;
a receiver phase noise power due to an intermodulation product;
an intermodulation product carrier power;
an intermodulation product spectral noise power; and
a receiver power gain compression.

16. The article of claim 15 wherein the instructions causing a machine to provide a list of interference components to a user comprises instructions causing a machine to provide a list of independent interference components.

17. The article of claim 15 wherein the instructions causing a machine to provide a list of interference components to a user further comprises instructions causing a machine to provide a list of independent interference components satisfying a signal-to-interference ratio equal to:

$$\frac{S_D G(\Delta f)}{N_r(\Delta f) + N_{PNr}(\Delta f) + P_{ci}(\Delta f) + P_{mi}(\Delta f) + N_{Si}(\Delta f) + N_{PNrIM}(\Delta f) + P_{ciIM}(\Delta f) + N_{SiIM}(\Delta f)}$$

where:
  $S_D$ is a desired signal power,
  $G(\Delta f)$ is the receiver power gain compression,
  $N_r(\Delta f)$ is the receiver thermal noise power,
  $N_{PNr}(\Delta f)$ is the receiver phase noise power due to the interference carrier,
  $P_{ci}(\Delta f)$ is the interference carrier power,
  $P_{mi}(\Delta f)$ is the portion of the interference modulation power that can be detected,
  $N_{Si}(\Delta f)$ is the interference spectral noise power,
  $N_{PNrIM}(\Delta f)$ is the receiver phase noise power due to the intermodulation product,
  $P_{ciIM}(\Delta f)$ is the intermodulation product carrier power, and
  $N_{SiIM}(\Delta f)$ is the intermodulation product spectral noise power.

18. The article of claim 15, further comprising instructions causing a machine to:
  provide to the user a list of analyses to perform, the list of analysis comprising a statistical analysis, a static and frequency swept receiver to transmitter analysis; and
  receive from the user one or more analyses selected by the user,
  wherein the instructions causing a machine to perform the analysis comprises instructions causing a machine perform the analysis selected by the user from the list of analyses to perform.

19. The article of claim 15, further comprising instructions causing a machine to receive model data from a tool library.

20. The article of claim 15, further comprising instructions causing a machine to:
  receive performance data on radio and antenna models;
  generate the radio and antenna models based on the performance data.

21. The article of claim 15 wherein the instructions causing a machine to provide a list of interference components to a user comprises instructions causing a machine to provide a list of interference components comprising an intermodulation component, and
  further comprising instructions causing a machine to determine the intermodulation component by using stored harmonic orders.

22. A method to simulate performance of a communication system comprising:
  providing a list of interference components to a user;
  receiving from the user selections of interference components from the list of the interference components;
  performing an analysis based on the user selections of the interference components; and
  rendering a result of the analysis,
  wherein providing a list of interference components to a user comprises providing a list of independent interference components comprising:
    a receiver thermal noise power;
    a receiver phase noise power due to an interference carrier;
    an interference carrier power;
    an interference modulation power that can be detected;
    an interference spectral noise power;
    a receiver phase noise power due to an intermodulation product;
    an intermodulation product carrier power;
    an intermodulation product spectral noise power; and
    receiver power gain compression.

23. The method of claim 22 wherein providing a list of interference components to a user further comprises providing a list of independent interference components satisfying a signal-to-interference ratio equal to:

$$\frac{S_D G(\Delta f)}{N_r(\Delta f) + N_{PNr}(\Delta f) + P_{ci}(\Delta f) + P_{mi}(\Delta f) + N_{Si}(\Delta f) + N_{PNrIM}(\Delta f) + P_{ciIM}(\Delta f) + N_{SiIM}(\Delta f)}$$

where:
  $S_D$ is a desired signal power,
  $G(\Delta f)$ is the receiver power gain compression,
  $N_r(\Delta f)$ is the receiver thermal noise power,
  $N_{PNr}(\Delta f)$ is the receiver phase noise power due to the interference carrier,
  $P_{ci}(\Delta f)$ is the interference carrier power,
  $P_{mi}(\Delta f)$ is the portion of the interference modulation power that can be detected,
  $N_{Si}(\Delta f)$ is the interference spectral noise power,
  $N_{PNrIM}(M)$ is the receiver phase noise power due to an intermodulation product,
  $P_{ciIM}(\Delta f)$ is the intermodulation product carrier power, and
  $N_{SiIM}(\Delta f)$ is the intermodulation product spectral noise power.

* * * * *